US008060280B2

(12) United States Patent
Hadi et al.

(10) Patent No.: US 8,060,280 B2
(45) Date of Patent: Nov. 15, 2011

(54) VISION SYSTEM FOR DEPLOYING SAFETY SYSTEMS

(75) Inventors: Salah Hadi, Linköping (SE); Stephen Decker, Auburn Hills, MI (US)

(73) Assignee: Autoliv ASP, Inc., Ogden, UT (US)

( * ) Notice: Subject to any disclaimer, the term of this patent is extended or adjusted under 35 U.S.C. 154(b) by 882 days.

(21) Appl. No.: 12/103,631

(22) Filed: Apr. 15, 2008

(65) Prior Publication Data

US 2009/0259368 A1 Oct. 15, 2009

(51) Int. Cl.
*B60R 22/00* (2006.01)
(52) U.S. Cl. ........................................................ 701/45
(58) Field of Classification Search .................... 701/45, 701/70; 280/735
See application file for complete search history.

(56) References Cited

U.S. PATENT DOCUMENTS

| | | | |
|---|---|---|---|
| 5,410,346 A | 4/1995 | Saneyoshi et al. | |
| 5,541,590 A | 7/1996 | Nishio | |
| 5,555,312 A | 9/1996 | Shima et al. | |
| 5,761,326 A | 6/1998 | Brady et al. | |
| 5,767,922 A | 6/1998 | Zabih et al. | |
| 5,845,000 A | 12/1998 | Breed et al. | |
| 5,913,375 A | 6/1999 | Nishikawa | |
| 5,963,653 A | 10/1999 | McNary et al. | |
| 5,987,174 A | 11/1999 | Nakamura et al. | |
| 6,442,476 B1 * | 8/2002 | Poropat | 701/207 |
| 6,674,394 B1 | 1/2004 | Zoratti | |
| 6,801,662 B1 | 10/2004 | Owechko et al. | |
| 6,826,468 B2 | 11/2004 | Williams | |
| 6,838,980 B2 | 1/2005 | Gloger et al. | |
| 2002/0095246 A1 | 7/2002 | Kawazoe | |
| 2003/0025597 A1 | 2/2003 | Schofield | |
| 2003/0149530 A1 | 8/2003 | Stopczynski | |
| 2003/0156015 A1 | 8/2003 | Winner et al. | |
| 2003/0179084 A1 | 9/2003 | Skrbina et al. | |
| 2003/0195667 A1 | 10/2003 | Tange et al. | |
| 2004/0016870 A1 | 1/2004 | Pawlicki et al. | |
| 2004/0098197 A1 | 5/2004 | Matsumoto et al. | |
| 2004/0107033 A1 | 6/2004 | Rao et al. | |

(Continued)

FOREIGN PATENT DOCUMENTS

DE 199 61 799 A 1 7/2001

OTHER PUBLICATIONS

C. Coué, Th. Fraichard, P. Bessiè and E. Mazer. Inria Rhône-Alpes & Gravir—CNRS, "*Using Bayesian Programming for Multi-Sensor Multi-Target Trackign in Automotive Applications*", Proceedings of the 2003 IEEE International Conference on Robotics and Automation, Taipei, Taiwan, Sep. 14-19, 2003, pp. 2104-2109.

(Continued)

*Primary Examiner* — Faye M. Fleming
(74) *Attorney, Agent, or Firm* — Sally J. Brown; Brinks Hofer Gilson & Lione

(57) ABSTRACT

A control system for safety deployment. The control system includes a processor, a first imaging sensor, and a second imaging sensor. The first and second imaging sensor are in electrical communication with the processor. The processor generates a safety system activation decision based on two-dimensional information received from the first imaging sensor and three-dimensional information based on the first and second imaging sensor.

21 Claims, 2 Drawing Sheets

U.S. PATENT DOCUMENTS

| | | | |
|---|---|---|---|
| 2004/0183663 | A1 | 9/2004 | Shimakage |
| 2004/0233051 | A1 | 11/2004 | Madau |
| 2006/0178830 | A1* | 8/2006 | Sherony .................. 701/301 |
| 2007/0091173 | A1 | 4/2007 | Kade et al. |
| 2007/0152803 | A1 | 7/2007 | Huang et al. |
| 2007/0219720 | A1* | 9/2007 | Trepagnier et al. ........... 701/300 |
| 2007/0255474 | A1 | 11/2007 | Hayakawa et al. |
| 2008/0049975 | A1 | 2/2008 | Stiegler |
| 2009/0021609 | A1* | 1/2009 | Luo et al. .................. 348/241 |
| 2010/0106356 | A1* | 4/2010 | Trepagnier et al. ............. 701/25 |

OTHER PUBLICATIONS

Notification of Transmittal of the International Search Report and the Written Opinion of the International Searching Authority, or the Declaration for International Application No. PCT/US09/40570, Dated Sep. 23, 2009.

Notification of Transmittal of the International Search Report and the Written Opinion of the International Searching Authority, or the Declaration, International Application No. PCT/US09/40571, Dated May 26, 2009.

* cited by examiner

VISION SYSTEM FOR DEPLOYING SAFETY SYSTEMS

FIELD OF THE INVENTION

This invention relates to a system for sensing a motor vehicle impact and the deployment of a safety device.

BACKGROUND AND SUMMARY OF THE INVENTION

Enhancements in automotive safety systems over the past several decades have provided dramatic improvements in vehicle occupant protection. Presently available motor vehicles include an array of such systems, including inflatable restraint systems for protection of occupants from frontal impacts, side impacts, and roll-over conditions. Advancements in restraint belts and vehicle interior energy absorbing systems have also contributed to enhancements in safety. Many of these systems must be deployed or actuated in a non-reversible manner upon the detection of a vehicle impact to provide their beneficial effect. Many designs for such sensors are presently used to detect the presence of an impact or roll-over condition as it occurs.

In addition, attention has been directed recently to providing deployable systems external to the vehicle. For example, when an impact with a pedestrian or bicyclist is imminent, external airbags can be deployed to reduce the severity of impact between the vehicle and pedestrian. Collisions with bicyclists and pedestrians account for a significant number of motor vehicle fatalities annually. Another function of an external airbag may be to provide greater compatibility between two vehicles when an impact occurs. While an effort has been made to match bumper heights for passenger cars, there remains a disparity between bumper heights, especially between classes of passenger vehicles, and especially involving collisions with heavy trucks. Through deployment of an external airbag system prior to impact, the bag can provide enhancements in the mechanical interaction between the vehicles in a manner which provides greater energy absorption, thereby reducing the severity of injuries to vehicle occupants.

For any safety system to operate properly, a robust sensing system is necessary. Unlike crash sensors which trigger deployment while the vehicle is crushing and decelerating, an imaging based sensing system can anticipate an impact before it has occurred. The "Time Before Collision" can be critical and, for example in an external airbag system provides the time to deploy the actuator (e.g. 30-200 ms) to clear the distance in front of the vehicle (e.g. 100-800 mm). Inadvertent deployment of safety systems is not only costly but may temporarily disable the vehicle. Moreover, since the deployment of many safety systems is achieved through a release of energy, deployment at an inappropriate time may result in undesirable effects. This invention is related to a sensing system for sensing an impending collision which addresses these design concerns.

Radar detection systems have been studied and employed for motor vehicles for many years. Radar systems for motor vehicles operate much like their aviation counterparts in that a radio frequency signal, typically in the microwave region, is emitted from an antenna on the vehicle and the reflected-back signal is analyzed to reveal information about the reflecting target. Such systems have been considered for use in active braking systems for motor vehicles, as well as obstacle detection systems for vehicle drivers. Radar sensing systems also have applicability in deploying external airbags. Radar sensors provide a number of valuable inputs, including the ability to detect the range to the closest object with a high degree of accuracy (e.g. 5 cm). They can also provide an output enabling measurement of closing velocity to a target with high accuracy. The radar cross section of the target and the characteristics of the return signal may also be used as a means of characterizing the target.

Although information obtained from radar systems yield valuable data, reliance upon a radar sensor signal for deploying a safety device may have certain negative consequences. As mentioned previously, deployment of the external airbag is a significant event and should only occur when needed in an impending impact situation. Radar sensor systems are, however, prone to "false-positive" indications. These are typically due to phenomena such as a ground reflection, projection of small objects, and software misinterpretation, which faults are referred to as "fooling" and "ghosting". For example, a small metal object with a reflector type geometry can return as much energy as a small car and as such can generate a collision signal in the radar even when the object is too small to damage the vehicle in a substantial way. Also, there may be "near miss" situations where a target is traveling fast enough to avoid collision, yet the radar sensor system would provide a triggering signal for the safety system.

Imaging sensors have also been used to anticipate vehicle collisions. However, a single imaging sensor provides only two-dimensional position information about approaching objects. Certain aspects can be inferred about the travel of the object outside of the two-dimensional position, for example by determining a change is size of the object over a time period, but again this technique is not reliable enough for determining the deployment of a safety system. Alternatively, multiple vision sensors may be used to generate stereo or a three-dimensional vision system that is mounted to the vehicle. The pair of two-dimensional cameras can be designed to work as a stereo pair. By designing a stereo pair, the set of cameras can generate a three-dimensional image of the scene. Both the two-dimensional and three-dimensional vision sensors determine a range to the sensed object, the object classification, and the trajectory of the object. This information is important for correct fusion of the independently sensed information especially in a multiple target environment. The fusion of the two-dimensional and three-dimensional sensing systems provide a highly reliable non-contact sensing of an impending collision. The invention functions to provide a signal that an impact is imminent. This signal of an impending crash is generated from an object approaching the vehicle from any direction in which the sensor system is installed. In addition to an indication of impending crash, the sensor system may also indicate the potential intensity of the crash. The exact time of impact, and the direction of the impact may also be indicated by this fused sensor system. The intensity of the crash is determined by the relative size of the striking object, and the speed with which the object is approaching the host vehicle. The time and direction of the impact can be determined by repeated measurements of the object's position. This sequence of position data points can be used to compute an objects trajectory, and by comparing this trajectory with that of the host vehicle, a point of impact can be determined. The closing velocity can also be determined by using the position data and trajectory calculations.

By sensing and notifying the safety system of an imminent crash, this sensor enables the safety system to prepare for the impact prior to the impact. The safety system can tighten the seat belts by activating an electric pre-tensioner, which makes the seat belt system more effective at restraining the occupant after contact with the object, and during the deceleration force of the crash. The advanced warning of a frontal crash can be used to inflate a larger airbag at a much slower rate. The slower rate would reduce the potential of injury by the inflating airbag, and the larger size would offer a higher level of potential energy absorption to the occupant, compared to a smaller bag. Other advantages of the forward-looking application of this sensor are the ability to deploy additional structures or modify existing structures to maximize occupant safety. These structures could be expanding bumpers or additional frame rails or pressurized body components that would add a level of safety just prior to impact during a crash.

Additional deployment time enables safety devices that are slow in comparison to today's airbags. The seating position and headrest position can be modified, based on advanced crash information to increase their effectiveness in a variety of crash scenarios. Electric knee bolster extenders can be enabled to help hold the occupant in position during a crash. Advance warning also enables the windows and sunroof to close to further increase crash safety. External structures can be modified with advance notice of an impending crash. Structures such as extendable bumpers and external airbags can be deployed to further reduce the crash forces transmitted to the vehicle's occupants.

The system can be used in a side looking application with additional benefit to occupant safety in side crash scenarios. Knowing that a side impact will occur in advance of contact allows the side airbag to achieve similar benefit that the front airbags achieved with activation prior to impact. Such advanced activation would allow larger side bags and side curtains to deploy at slower, less aggressive rates. In a case where the contact based side airbag activation might trigger late in the crash, there is potential for the occupant to be displaced laterally before the airbag is triggered. Such displacement prior to activation reduces the effectiveness of the side airbag. In the case where a sliding vehicle crashes into a solid pole in an area of the side of the car that has less structure, like the passenger door, an acceleration based deployment system would not deploy the airbag until significant intrusion has taken place. The pre-crash sensor described here in a side looking application would give the safety system the ability to trigger the airbags prior to contact with the pole, and making the airbag more effective in protecting the occupant from the pole intrusion.

In a rearward looking application, the system may be used with further benefit to the host vehicle's occupants. Advance knowledge of a rear-end collision prior to contact gives the host vehicle's safety system time to move any reclined seats to a more safe upright position. The safety system has time to take up the seatbelt slack with an electric pre-tensioner to make the seatbelt more effective. Modifying the host vehicle structure is also possible with collision warning prior to impact. An expandable rear bumper could be deployed and help to absorb additional crash energy that would otherwise be transferred to the host vehicle occupants.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
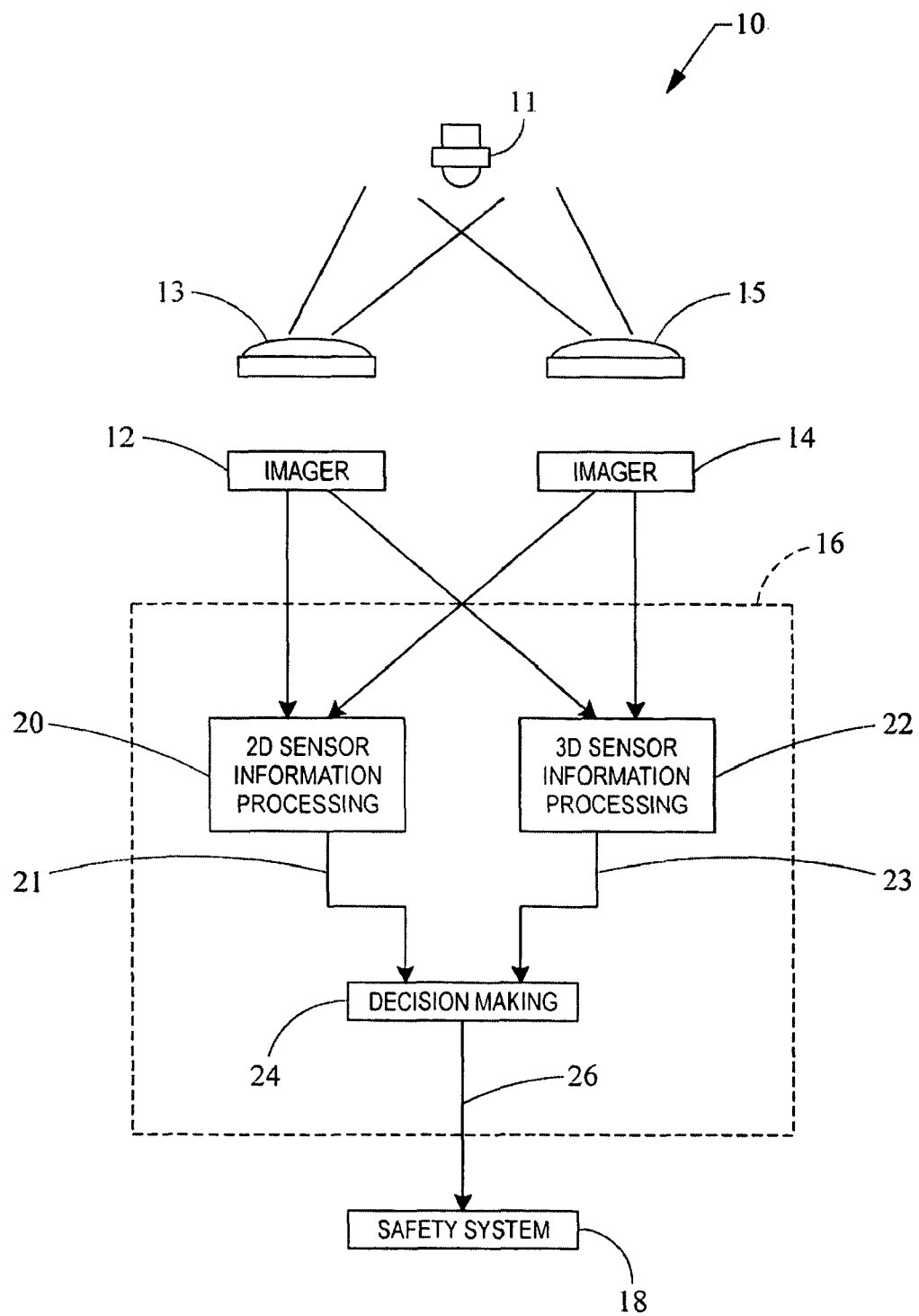
FIG. 1 is schematic view of a system for sensing a collision and controlling deployment of a safety system in accordance with one embodiment of the present invention.

Referring now to FIG. 1, a system embodying the principles of the present invention is illustrated therein and designated at 10. The system 10 includes a first imager 12, a second imager 14, and a processor 16.

The first imager 12 and the second imager 14 are configured in a spaced relationship to view an object 11. The first imager 12 has a lens system 13 that is configured to view an object from a first direction. The second imager 14 includes a second lens system 15 configured to view the object 11 from a second direction. Since the first imager 12 and second imager 14 produce images of the object from different directions, the object may have a different apparent location between the first imager 12 and second imager 14.

The two-dimensional images from the first and second imager 12, 14, are provided to a two-dimensional information processing algorithm 20 in processor 16. The two-dimensional information from each imager 12, 14 may be used independently. For example, the first imager 12 may utilize the two-dimensional information in the image to determine a two-dimensional spacial relationship of the object to the imager 12, use successive images to determine the distance or trajectory of the object 11, and/or use gray scale information to classify the object. Similarly, the second imager 14 may also utilize the two-dimensional information in the image to determine a two-dimensional spacial relationship of the object 11 to the imager 14, use successive images to determine the distance or trajectory of the object 11, and/or use gray scale information to classify the object 11.

In addition, the two-dimensional images from the imagers 12, 14 may be provided to a three-dimensional information processing algorithm 22 in the processor 16 where the two-dimensional image from imager 12 and the two-dimensional image from imager 14 are used in a three-dimensional processing algorithm, such as a stereo processing algorithm. A stereo processing algorithm utilizes the same principles that provide depth perception for humans. An object is identified and the image from the first imager 12 and then separately identified in an image from the second imager 14. Knowing the relationship of the first imager 12 to the second imager 14 a triangulation method may be used to relate the position of the object 11 in the first imager 12 to the position of the object 11 in the second imager 14. Accordingly, a first analysis result 21 may be provided based on the two-dimensional information processing 20 and a separate analysis result 23 may be provided based on the three-dimensional information processing 22. Each analysis result 21, 23 may be an independent determination as to whether the object 11 will collide with the vehicle. A decision making block 24 may receive the analysis results 21, 23 and may combine the results for example, through a thresholding or weighting process to generate a deployment decision 26 that is communicated to the safety system 18 such as an airbag, seatbelt tensioners, expandable reinforcement devices, or other safety systems.

Figure 2:
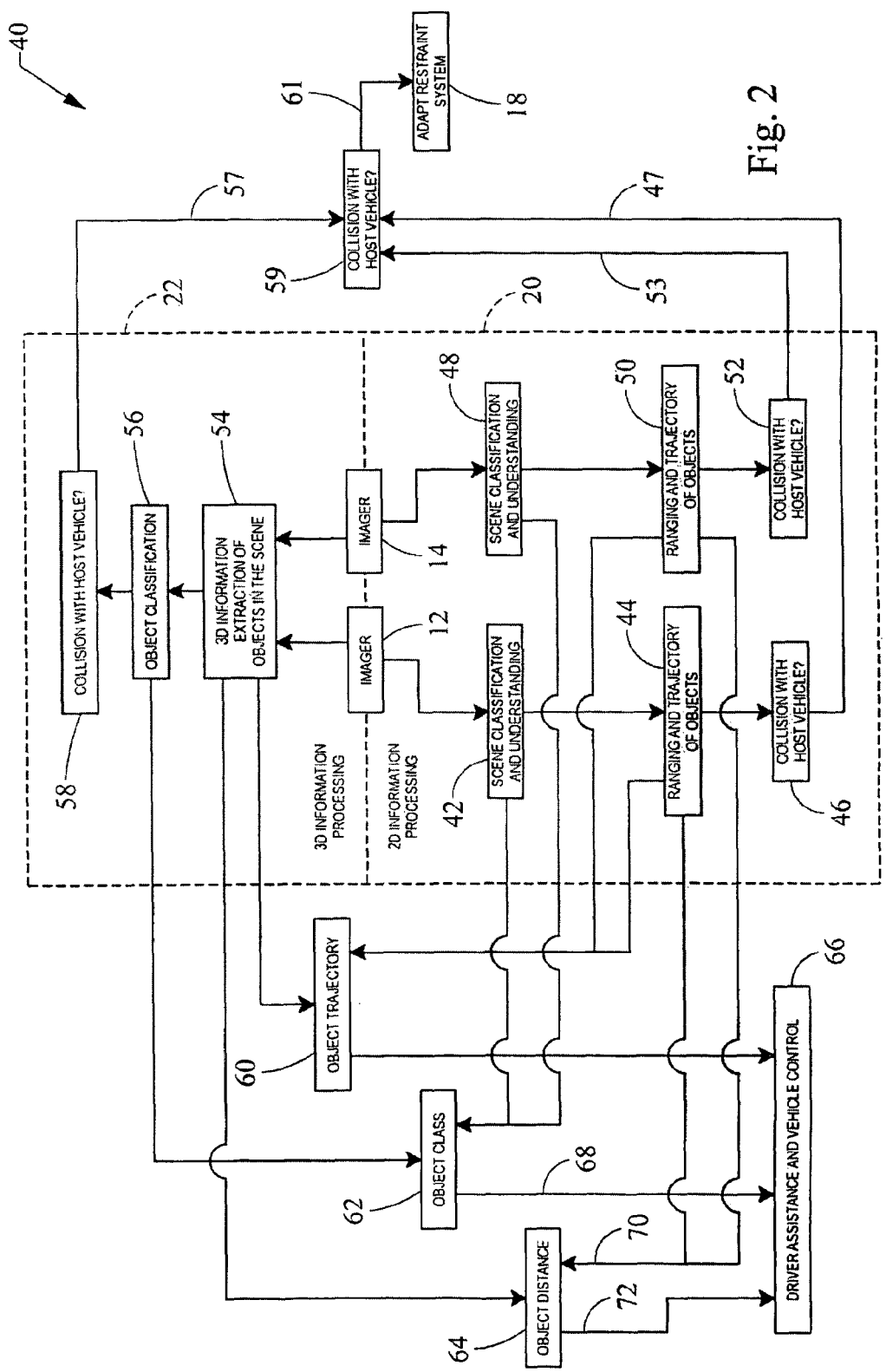
FIG. 2 is a schematic view of another embodiment of a system for sensing a collision.

Referring now to FIG. 2, another embodiment of a crash sensing system 40 is provided. As previously described above, the first imager 12 and second imager 14 are provided in a spaced relationship to view an object. The imagers 12 and 14 are each in communication with both a two-dimensional information processing algorithm 20 and a three-dimensional information processing algorithm 22. The first imager 12 provides two-dimensional image information to a scene classification and understanding algorithm 42. The scene classification and understanding algorithm 42 may, for example, determine the type of object such as a car, motorcycle, or truck based on the size and shape of the object in the two-dimensional image. The information from the scene classification and understanding algorithm 42 is provided to a ranging and trajectory algorithm 44. The ranging and trajectory algorithm 44 may determine the range and trajectory of objects identified in the scene classification and understanding algorithm 42. The range and trajectory of the objects may be determined based on the size, shape, and position of the object and, further, may be determined based on the size, shape, and position change over multiple images. The range and trajectory information from the ranging and trajectory algorithm 44 is provided to a collision decision algorithm 46. The collision decision algorithm 46 determines whether the objects will collide with the vehicle based on the ranging and trajectory information. In addition, the collision decision algorithm 46 may also consider other vehicle information in determining the likelihood of a collision with the host vehicle.

Similarly, the imager 14 provides the two-dimensional image to a scene classification and understanding algorithm 48. The scene classification and understanding algorithm 48 identifies and/or segments objects in the same manner as scene classification and understanding algorithm 42. The objects from the scene classification and understanding algorithm 48 are provided to a ranging and trajectory algorithm 50 that operates in a similar manner to ranging and trajectory algorithm 44. The results of the ranging and trajectory algorithm 50 are provided to a collision decision algorithm 52 that generates a collision decision in a similar manner to collision decision algorithm 46, but based on the image information from the second imager 14. The collision analysis 47 from the collision decision algorithm 46 is independent from the collision analysis 53 provided by the collision decision algorithm 52. Both collision analyses 47, 53 are provided to a deployment decision algorithm 59.

In addition, the two-dimensional information from imager 12 and imager 14 are both provided to a three-dimensional information extraction algorithm 54 and the three-dimensional information processing algorithm 52. In the three-dimensional information extraction algorithm 54, features in the scene of the first image from imager 12 and the second image from imager 14 are compared and related based on the feature information within each image, as well as the spacial and orientation relationship between the first imager 12 and second imager 14. Accordingly, the three-dimensional feature information is provided to an object classification algorithm 56 that determines the type of object, for example, a bike, pedestrian, or car that is identified by the algorithm 22. The object classification information from the object classification algorithm 56 is provided to a collision decision algorithm 58. The collision decision algorithm 58 utilizes the location and object classification information, as well as other information about the vehicle speed and trajectory to determine if a collision will occur. A collision analysis 57 is provided from the collision decision algorithm 58 to a deployment decision algorithm 59. The deployment decision algorithm 59 combines collision analysis 57, 53, and 47 to determine if one or more safety systems should be deployed. Each of the collision analyses 57, 53, and 47 may be independent decisions if a collision will occur. The deployment decision algorithm 59 combines the analyses 57, 53, and 47, for example by a weighting or thresholding method to generate a deployment decision 61 that is provided to one or more safety systems 18.

In addition, the information from the crash detection system 40 may be provided to a driver assistance and vehicle control system 66. Accordingly, the three-dimensional feature information from algorithm 54 and the ranging and trajectory information from algorithms 44 and 50 may be provided to an object trajectory algorithm 60 that combines the information from algorithms 54, 44, and 50 into object or trajectory information 68 with improved reliability over the analysis from the individual algorithms 54, 44, and 50. Similarly, the object classification information from the object classification algorithm 56 and object classification information from the scene classification and understanding algorithms 42 and 48 are provided to an object classification algorithm 62 where the information from the algorithms 56, 42, and 48 are combined to generate object classification information 70 with improved reliability over each of the independent algorithms 56, 42, and 48. In addition, an object distance algorithm 64 receives object distance information from the three-dimensional information extraction algorithm 54, the ranging and trajectory algorithm 44, and the ranging and trajectory algorithm 50. The object distance algorithm 64 combines the ranging information from the algorithms 54, 44, and 50 to generate object distance information 72 with improved reliability over the individual algorithms 54, 44, and 50. Algorithms 60, 62, and 64 may use various techniques to combine the information from the other algorithms and may include for example, weighting, averaging, or simply data verification methodologies to provide an improved result to the driver assistance and vehicle control system 66 which may then be used to actively manipulate the vehicle to avoid or reduce the impacts of a collision.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

We claim:

1. A control system for safety system deployment in a vehicle, the control system comprising:
a processor;
a first imaging sensor in electrical communication with the processor;
a second imaging sensor in electrical communication with the processor;
wherein the processor is configured to generate safety system activation decision based on two-dimensional information received from the first imaging sensor and three-dimensional information based at least partially on the first and second imaging sensor;
wherein the processor is configured to generate a first collision decision based on the two-dimensional information and a second collision decision based on the three-dimensional information.

2. The control system according to claim 1, wherein the processor is configured to generate a safety system activation decision based on two-dimensional information provided from the second imaging sensor and three-dimensional information generated based on the first and second imaging sensor.

3. The control system according to claim 2, wherein the first collision decision is generated based on the two-dimensional information received from the first imaging sensor, a second collision decision is generated by the two-dimensional information received from the second imaging sensor, and a third collision decision is generated based on the three-dimensional information, and wherein a safety system activation decision is generated based on the first, second and third collision decision.

4. The control system according to claim 1, wherein the processor is configured to generate an object trajectory based on a combination of the two-dimensional information and the three-dimensional information.

5. The control system according to claim 4, wherein the processor is configured to generate the safety system activation decision based on a two-dimensional information received from the first imaging sensor, two-dimensional information received from the second imaging sensor, and three-dimensional information generated based on the first and second imaging sensor.

6. The control system according to claim 5, wherein the first collision decision is generated based on the two-dimensional information received from the first imaging sensor, a second collision decision is generated by the two-dimensional information received from the second imaging sensor, and a third collision decision is generated based on the three-dimensional information, and wherein a safety system activation decision is generated based on the first, second and third collision decision.

7. The control system according to claim 1, wherein the processor is configured to generate an object class based on a combination of the two-dimensional information and the three-dimensional information.

8. The control system according to claim 7, wherein the processor is configured to generate the safety system activation decision based on a two-dimensional information received from the first imaging sensor, two-dimensional information received from the second imaging sensor, and three-dimensional information generated based on the first and second imaging sensor.

9. The control system according to claim 8, wherein the first collision decision is generated based on the two-dimensional information received from the first imaging sensor, a second collision decision is generated by the two-dimensional information received from the second imaging sensor, and a third collision decision is generated based on the three-dimensional information, and wherein a safety system activation decision is generated based on the first, second and third collision decision.

10. The control system according to claim 1, wherein the processor is configured to generate an object distance based on a combination of the two-dimensional information and the three-dimensional information.

11. The control system according to claim 10, wherein the processor is configured to generate the safety system activation decision based on a two-dimensional information received from the first imaging sensor, two-dimensional information received from the second imaging sensor, and three-dimensional information generated based on the first and second imaging sensor.

12. The control system according to claim 1, wherein the safety system activation decision is an airbag deployment decision.

13. The control system according to claim 1, wherein the processor is configured to adapt the safety system based on the object trajectory, the object class, and the object distance.

14. A method for controlling the safety system in a vehicle, the method comprising the steps of:
   generating two-dimensional information from a first imaging sensor;
   generating three-dimensional information based at least partially on a second imaging sensor;
   generating a first collision decision based on the two-dimensional information along a first processing path;
   generating a second collision decision based on the three-dimensional information along a second processing path; and
   generating a safety system activation decision based on the first and second collision decision.

15. The method according to claim 14, further comprising:
   generating two-dimensional information based on the second imaging sensor;
   generating a third collision decision based on a two-dimensional information received from the second imaging sensor; and
   generating the safety system activation decision based on the first, second and third collision decision.

16. The method according to claim 14, wherein the three-dimensional information is stereo imaging information.

17. The method according to claim 16, wherein the two-dimensional information is single detector imaging information.

18. The method according to claim 17, wherein the processor is configured to provide the object trajectory, object class, and object distance information to a driver system.

19. The method according to claim 14, wherein the processor is configured to adapt safety system deployment parameters based on the combination of the two-dimensional information and the three-dimensional information.

20. The system according to claim 1, wherein the first collision decision and second collision decision are each a determination as to whether an object will collide with the vehicle.

21. The method according to claim 14, wherein the first collision decision and second collision decision are each a determination as to whether an object will collide with the vehicle.

* * * * *